(No Model.)
C. C. SHELBY.
GARTER.
No. 312,297. Patented Feb. 17, 1885.
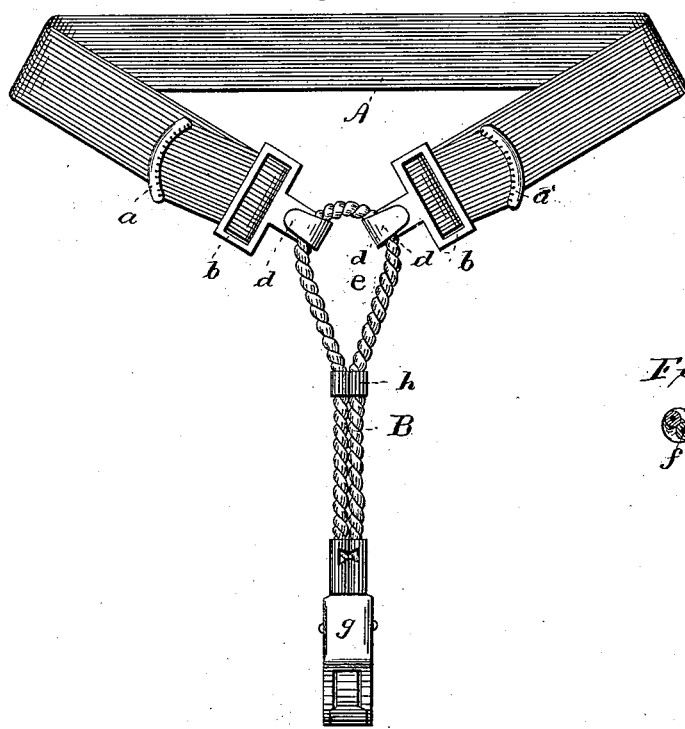
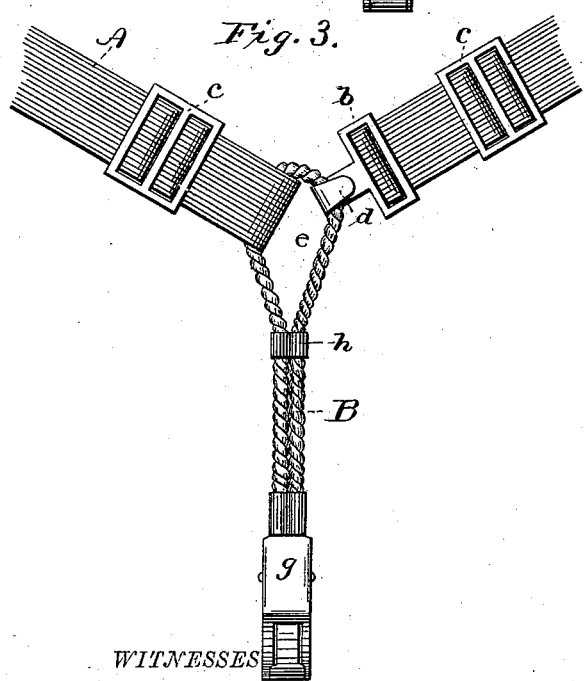
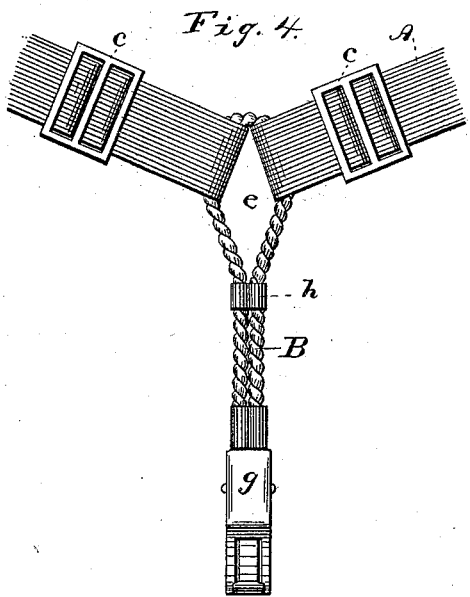
WITNESSES
Chas. R. Burr
A. F. Stewart
INVENTOR
Christopher C. Shelby
by Clinch & Clinch
his Attorneys

UNITED STATES PATENT OFFICE.

CHRISTOPHER C. SHELBY, OF NEW YORK, N. Y.

GARTER.

SPECIFICATION forming part of Letters Patent No. 312,297, dated February 17, 1885.

Application filed May 29, 1884. (No model.)

*To all whom it may concern:*

Be it known that I, CHRISTOPHER C. SHELBY, of the city, county, and State of New York, have invented certain new and useful Improvements in Garters; and I do hereby declare the following to be a full, clear, and exact description of the same, reference being had to the accompanying drawings, forming a part of this specification, and to the figures and letters of reference marked thereon.

My invention relates to that class of garters in which a piece of webbing, preferably elastic, is provided for encircling the wearer's leg, and has connected to it a pendent portion bearing at its lower end a suitable clasp or fastening for grasping the stocking; and it consists in certain novel details of construction, which will be first described, and then pointed out in the claims at the end of this specification.

In the accompanying drawings, Figure 1 represents a view of a garter constructed in accordance with my invention; Fig. 2, a cross-sectional view of the pendent portion, showing the wire within the braid. Figs. 3 and 4 are views of modifications of the invention.

Similar letters of reference in the several figures indicate the same parts.

The letter A indicates the webbing, which is designed to encircle the wearer's leg just above the calf. This webbing is preferably elastic. Its ends are provided with tips $a$ $a$, to prevent fraying out, and suitable slides—such as $b$ in Figs. 1 and 3 and such as $c$ in Figs. 3 and 4—are provided for the purpose of enabling a larger or a smaller loop to be formed by the webbing, according to the size of the wearer's leg.

In the embodiment of the invention shown in Fig. 1 the slides $b$ are each provided with a hook, $d$, and these hooks engage with loop $e$ of the pendent portion B. By preference I form this pendent portion of a hollow braid containing within it one or more flexible wires, $f$, as seen in Fig. 2, for strengthening and somewhat stiffening it. To the lower end of this braid I secure a suitable device for clamping and holding the stocking, the same preferably consisting of a jaw-clasp, $g$, such as shown, while at or near the middle of the braid I place an encircling-band, $h$, which serves properly to define the loop $e$ with which the hooks $d$ engage, and also to prevent the said hooks, or either of them, from slipping down toward the clasp $g$ and becoming disengaged. Also, by the use of the confining-band I am enabled to secure a relatively long depending portion without the disadvantages of a large loop, which would permit of the hook sliding down and loosening the garter, as described.

In applying the garter thus formed one of the hooks is disengaged from the pendent portion or loop $e$, the webbing A passed around the leg above the calf, the hook re-engaged with the loop, and, finally, the clasp is caused to clamp the upper portion of the wearer's stocking and hold it in the proper position of adjustment.

In the modification Fig. 3 but one hooked slide, $b$ $d$, is employed, the loop $e$ of the pendent portion being confined on the one side by a bight formed by turning back one end of the main webbing A, as shown; but in the modification shown in Fig. 4 the hooked slides $b$ $d$ are entirely omitted, the loop $e$ of the pendent portion being held by the bights formed by bending back both the ends of the main webbing, as shown. In this last modification the garter can be applied either by drawing it over the wearer's foot or by unfastening one end of the main webbing A from its slide, passing said end through the loop $e$ of the pendent portion, and then resecuring the end of the webbing, as before.

Having thus described my invention, what I claim as new is—

1. The garter consisting of the main webbing and its slides and the pendent portion having the band applied to it to define the loop, and having also the clasp or stocking-holder applied to its lower end, substantially as described.

2. The garter consisting of the main webbing and its slides, the pendent portion made of tubular braid containing flexible though inelastic wire, and having the band for defining the loop and the clasp at the lower end, substantially as described.

CHRISTOPHER C. SHELBY.

Witnesses:
 WM. C. SHELBY,
 JOHN B. GREEN.